March 17, 1925.
C. F. MENGE
1,530,388
WOOD FILLED METAL RIM AND PROCESS OF MAKING THE SAME
Filed Jan. 16, 1922 2 Sheets-Sheet 2
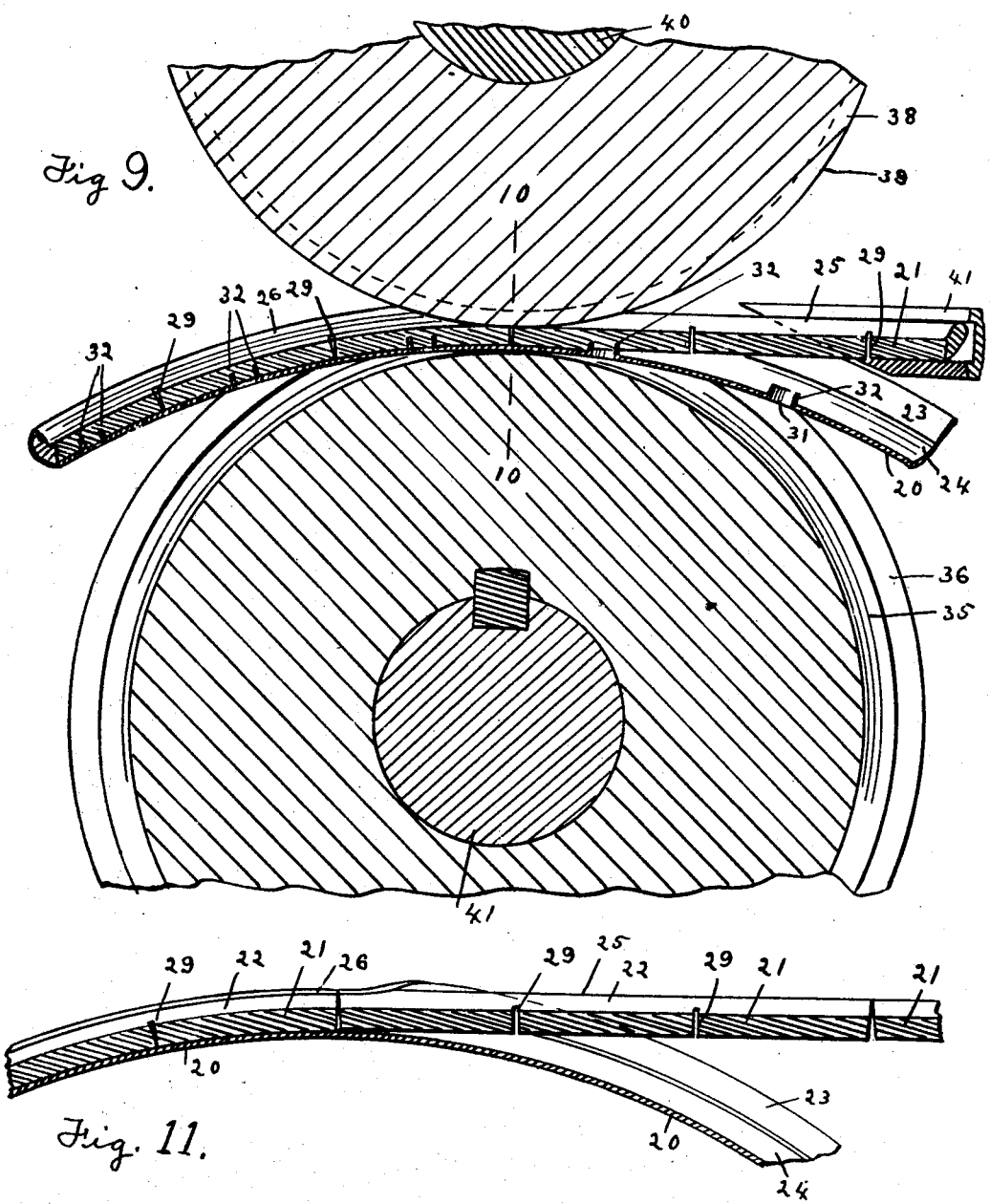

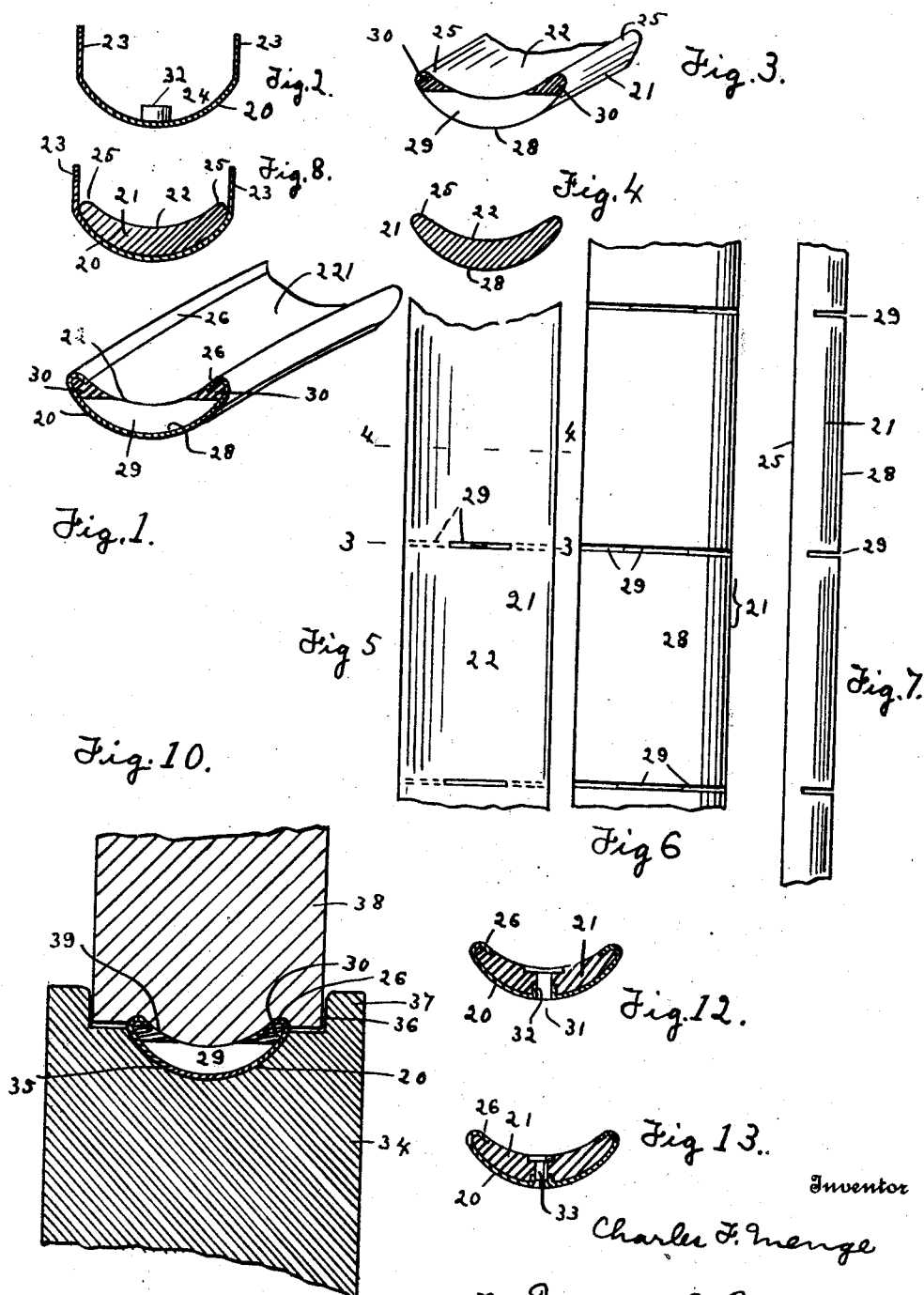

Patented Mar. 17, 1925.

1,530,388

UNITED STATES PATENT OFFICE.

CHARLES F. MENGE, OF UTICA, NEW YORK, ASSIGNOR TO WILLIAMS STEEL WHEEL & RIM CO. INC., OF UTICA, NEW YORK, A CORPORATION.

WOOD-FILLED METAL RIM AND PROCESS OF MAKING THE SAME.

Application filed January 16, 1922. Serial No. 529,807.

*To all whom it may concern:*

Be it known that I, CHARLES F. MENGE, a citizen of the United States, and a resident of Utica, in the county of Oneida and State of New York, have invented certain new and useful Improvements in Wood-Filled Metal Rims and Processes of Making the Same; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a wood-filled metal rim adapted to have a rubber tire cemented thereto and to the process of forming the same.

One purpose of my invention is to provide as a new product a wood-filled metal rim adapted to have a rubber tire cemented thereto and further to provide a product of the type mentioned which is novel in construction and efficient and durable in use.

It has long been recognized in the art that metal rims for bicycle wheels and other vehicle wheels were stronger, cheaper and in most other respects better than wood rims, but it has also been recognized that the rubber tires can not be securely cemented to the all metal rims for the reason that any cement practically used does not hold the rubber tires to the metal surface. On the other hand while the wood rim is more difficult to make and more costly in construction and weaker and less durable, through providing a wood surface it does admit of tightly cementing thereto at the factory or ordinary repair shop by ordinary cement the tire of the wheel. The purpose of my invention, therefore, is to provide a rim of metal and having the advantages of the metal rim without the disadvantage of the metal rim, but rather with the advantage of the wood rim, namely that a wood surface is provided on the inner side of the metal rim to which the tire can be readily cemented.

A further purpose is to provide a rim of the construction above referred to having a wood-filler of new, improved and very economical construction in that the wood-filler is formed of straight pieces or strips of wood so constructed that it may be bent to the circumferential curve of the rim without steaming the wood or otherwise preliminarily bending it to the curve of the rim.

A still further object is to provide a form of rim of the character described of such construction that the wood-filler may be formed of relatively cheap wood and be economically formed also from more than one piece of wood for a rim. In other words, the filler of a rim may be made up of two or more pieces of varying length as long as their total length equals the circumference of the rim.

A further object of my invention is to provide a process of making a wood-filled metal rim of the character described; and furthermore to point out a process which may be readily and quickly performed with a minimum of hand work or supervision and with such manual work and supervision of such character that the ordinary operator may perform the same.

Further purposes and advantages of this invention will appear from the specification and claims herein.

Fig. 1 is a combined transverse section through and a perspective view of a portion of a wood-filled metal rim embodying my invention in one form.

Fig. 2 is a transverse sectional view through a metal rim of a form that may be used in producing my product but before the rim has had placed therein the wood-filler and also before the rim has been rolled down upon the wood-filler.

Fig. 3 is a combined sectional view through and a perspective view of a portion of a wood strip used in producing the complete article of my invention, the section being taken along the line of 3—3 of Fig. 5.

Fig. 4 is a similar transverse section through the wood-filler but on line 4—4 of Fig. 5.

Fig. 5 is a plan view of the outer side of part of said wood-filling strip.

Fig. 6 is a plan view of the inner side of said strip.

Fig. 7 is an edge view of part of said filling strip.

Fig. 8 is a transverse sectional view through the metal rim proper and the wood-filling strip as the parts are placed together but before the outwardly extending flanges of the rim are turned down upon the filling strip.

Fig. 9 is a vertical section through an assembly machine and a central circumferential section through a portion of a rim with the parts placed together and in process of being permanently assembled, the part to the right of the center line showing how the straight strip of the wood-filler comes to the rim at a tangent and that to the left of the center line of the view showing how the filler is bent to the curve of the rim.

Fig. 10 is a sectional view on line 10—10 of Fig. 9.

Fig. 11 is a diagrammatic view illustrating the wood-filler in process of being formed as in Fig. 9, but with the filler formed of a number of separate pieces of wood preferably having beveled ends.

Fig. 12 is a transverse view of the rim after the wood-filler has been placed in the rim and the spoke hole bored through the wood.

Fig. 13 is a transverse sectional view of a rim showing rivets as further fastening means.

Referring to the drawings in a more particular description it will be seen that the complete article or product of my invention consists of a metal rim proper 20 and a wood-filling strip 21 secured thereto and of such shape as to afford a proper surface 22 preferably concave to which is to be cemented the rubber tire of ordinary shape and construction and therefore not shown.

The metal rim 20 may be of any desired shape in detail but in the main will be trough shaped when completed in order to more readily receive and have fastened thereto the wood-filler 21. The metal rim may conveniently be formed arc-shaped in transverse section about as shown in Fig. 2 with the two opposite edges or flanges 23 of the rim extending outwardly.

The wood-filler 21 is formed of a size and shape to fit into the trough 24 of the rim 20 as clearly shown in Fig. 8. The outer or concave side 22 of the wood-filler is formed of a curve or shape to fit the rubber tire closely. The parts will be of such proportion that when the outwardly extending edges or flanges 23 of the rim are turned towards each other and then down closely upon the outer and upper edges 25 of the wood-filler the wood-filling will be held securely to the metal rim 20 and the outwardly extending flanges 23 of the rim will form narrow bands 26 extending in a short distance from the extreme edge of the completed rim over the outer surface of the filler strip 21. When the outward flanges 23 are turned down to form the bands 26, considerable pressure will be used so that the outer surface of said bands will be in the same general curve as the outer surface 22 of the filling strip 21 and said bands 26 with the outer surface of the wood-filler will be closely engaged by the rubber tire which is to be applied to the wheel. The wood-filled rim so far described relates to its structure as it would be seen in transverse section in a completed article whereby much the larger surface of the product engaged by the rubber tire is of wood and so forms a good surface for cement as distinguished from the narrow metal bands 26 at each side of the rim.

The wood-filling strip 21 is formed of the desired shape and size as regards transverse section as already described. This filling strip, however, is formed of one or more straight pieces of wood and is so constructed as to be mounted upon the rim and bent to the circumferential curve of the rim without preliminarily bending the filling strip to the curve of the rim and without preliminarily treating the wood-filling strip as by soaking or steaming or any chemical process to make it readily bend to the desired curve. The filling strip or strips are rendered capable of being bent to the desired circumferential curve of the rim by sawing or otherwise cutting into the strip from its inner side 28 transversely extending slits 29. These slits will extend out from the inner side 28 of the wood-filler until the slit comes well through the lower or central part of the outer or concave side 22 of the wood-filler and will in effect leave only the two edge or ear portions 30 of the wood-filler unsevered as most clearly appears in Figs. 1 and 3. These edge portions of the filling strip will, however, keep the strip together and will entirely fill the hooked part of the metal rim below the bands 26. The slits 29 will be formed along the filling strip at relatively close intervals and will allow the filling strip to be readily bent to the circumferential curve of the rim through the fiber of the wood in the edge or ear portions 30 bending decidedly and through the opposite faces of the slits 29 approaching each other closely especially nearest the rim as is obvious from the completed rim at the left of the center line of Fig. 9. Aside from the local bending of the fiber of the wood in the connecting ear portions 30 the body of the wood-filler will also be generally bent to the curve of the rim.

The abutting ends of the pieces of filling strip will also preferably be beveled that is shorter on the inner side of the strips than on the outer sides as plainly indicated in Fig. 11. This beveling of the ends will facilitate the bending and fitting of the straight filling pieces to the curve of the rim especially where the filling pieces are relatively short as indicated in Fig. 11.

My process of forming a wood-filled metal rim of the class described consists of feeding the straight and dry (that is not soaked or steamed) wood-filler 21 into the trough of the rim 20 and then bending the said filler to the circumferential curve of the rim and at the same time turning the outwardly extending flanges of the metal rim towards each other and sharply down upon the outer edges of the filling strip. In this way the filling strip is permanently held in place in the rim and from sliding circumferentially thereof and also the wood-filling strip is held permanently to the curve of the rim.

Preferably the spoke holes 31 through the metal rim will be punched or otherwise made in the metal rim before the wood-filling is mounted thereon. Preferably these spoke holes will be punched into the rim from its inner or convex surface towards its outer or concave surface and in such punching operation the metal will be drawn or burred outwardly around the hole perceptibly; which outward projections or burrs 32 will act as a means for further fastening the wood-filling strip from any creeping or circumferential movement within the rim, since the pressure used in assembling will force these projections 32 into the adjacent surface of the fitting strip.

If desired additional fastening means such as rivets 33 or the like may be used to hold the wood-filling strip in place in the rim.

It will be seen that the wood-filling strip for a given rim need not be formed all of one piece of wood but may be formed from two or three or more lengths or strips of proper transverse shape and of total length equalling the circumference of the rim. When two or more separate pieces are thus used to form a complete filler the abutting ends of the pieces will be beveled as suggested in Fig. 13. When the pieces are in a straight line as in said Fig. 13 there will be space on their inner surface but the ear portions 30 will be in contact with each other. In this way as the two pieces are bent to the curve of the rim the space towards the rim will be substantially closed but the adjacent pieces have been permitted a bending action without buckling the wood or the rim.

In Figs. 9 and 10 are shown parts of a machine that may be used in assembling my product and performing my process. The roller 34 has a concave peripheral groove 35 to receive the inner side of the metal rim proper 20 while the opposing roller 38 has a face 39 shaped as seen in the drawings with recesses towards its edge to engage the upstanding flanges 23 of the rim and turn them towards each other and down upon the upper edges 25 of the wood-filling pieces and form the bands 26 by pressing said flanges 23 down into the wood-filling strip. In the right-hand portion of Fig. 9 it will be seen that the wood-filling piece 21, as yet straight, is approaching the compression point or line 10—10 of the rollers 38 and 34 on a straight line from a passage-way in the guide 41. The metal rim proper 20 is approaching the ultimate compression line 10—10 on the natural curve of the rim. As the parts approach it will be seen that the upstanding projections 32 in the rim will engage the bottom or inner side 28 of the wood-filling strip 20 between the slots 29 and as the rollers 34 and 38 draw the filling strip and rim into the rollers and close together the projections 32 will be forced their entire distance into the body of the filling strips. The recesses in the sides of the forming surface 39 of the roller 38 will turn the flanges 23 towards each other and down into the wood-filling strip forming the bands 26 by the time the rim and its filling strip come to the line 10—10 of Fig. 9. As the assembling process is carried on it will be seen that the straight filling strips 21 are bent to the curve of the periphery of the rim and the wood-filling strips are securely held in place in the rim by the bands 26 and that the wood-filling strips may be further prevented from any tendency to creep in the rim by the use of the projections 32 in the metal rim which will form anchors deeply imbedded in the wood-filling strip. After a complete rim has thus been formed it will be removed from between the forming rollers and the spoke holes completed by bearing the same down through the wood-filling strips concentric with and preferably substantially the same size as the spoke holes 31 in the metal rim proper.

One of the presser rolls, say the lower roll 34, may be provided with upstanding flanges 37 on its opposite peripheral edges forming a wide groove upon the face of the roller 34 with faces 36 which engage the outer parts of the opposite sides of the roll 38 in order to keep the rolls closely in alignment and so aiding in assembling the metal rim and wood-filler accurately.

In Fig. 13 is shown a transverse section through a completed rim whereon a rivet 33 is used as a further means for holding the parts together and for preventing the wood-filler creeping in the rim.

What I claim as new and desire to secure by Letters Patent is:

1. As a new product, a wood-filled metal rim adapted to have a rubber tire cemented thereto and comprising a metal rim trough-shaped in cross section with its edges turned down to engage and hold the wood filler in place, a wood-filler fitting into the trough of the rim and being formed of straight unconnected strips of wood bent dry to the circumferential curve of the rim and held to said surve against the resiliency of said wood by said down-turned edges of the metal rim.

2. As a new product, a wood-filled metal rim adapted to have a rubber tire cemented thereto and comprising a metal rim trough-shaped in cross section, a wood-filler fitting into the trough of the rim and being formed of straight unconnected strips of wood bent dry to the circumferential curve of the rim and means for holding the wood-filler in place against the resiliency of said wood.

3. As a new product, a wood-filled metal rim adapted to have a rubber tire cemented thereto and comprising a metal rim trough-shaped in cross section, a wood-filler fitting into the trough of the rim and being formed of straight unconnected strips of wood bent dry to the circumferential curve of the rim and means for holding the filling upon the rim and from sliding about the rim against the resiliency of said wood.

4. As a new product, a wood-filled metal rim adapted to have a rubber tire cemented thereto and comprising a metal rim trough-shaped in cross section, a wood-filler fitting into the trough of the rim and being formed of straight unconnected strips of wood with transverse slits cut therein from the inner side towards the outer side and bent dry to the circumferential curve of the rim and means for holding the wood-filler in place against the resiliency of said wood.

5. As a new product, a wood-filled metal rim adapted to have a rubber tire cemented thereto and comprising a metal rim trough-shaped in cross section, a wood-filler fitting into the trough of the rim and being formed of straight unconnected strips of wood with transverse slits cut therein from the inner side towards the outer side and bent dry to the circumferential curve of the rim and means for holding the filling upon the rim and from sliding about the rim.

6. As a new product, a wood-filled metal rim adapted to have a rubber tire cemented thereto and comprising a metal rim trough-shaped in cross section with its edges turned down to engage and hold a wood filler in place, a wood-filler fitting into the trough of the rim and being formed of straight unconnected strips of wood with transverse slits cut therein from the inner side towards the outer side and bent dry to the circumferential curve of the rim and held to said curve against the resiliency of said wood by said down-turned edges of the metal rim.

7. The process of forming a wood-filled metal rim adapted to have a rubber tire cemented thereto which consists of forming an outwardly-opening trough-shaped metal rim, placing in the trough a wood-filling consisting of straight pieces of wood, bending the filler dry to the circumferential curve of the rim and at the same time rolling the outwardly extending edges of the metal rim towards each other and down closely upon the outer edges of the filling.

8. As a new product, a wood-filled metal rim adapted to have a rubber tire cemented thereto and comprising a metal rim trough-shaped in cross section, a wood-filler fitting into the trough of the rim and being formed of straight unconnected strips of wood bent dry to the circumferential curve of the rim, said metal rim having outwardly extending burrs or projections which are forced into the inner surface of the wood-filler and prevent its creeping and means for holding all parts of said unconnected wood filler to the metal rim against the resiliency of said wood.

9. As a new product, a wood-filled metal rim adapted to have a rubber tire cemented thereto and comprising a metal rim trough-shaped in cross section, a wood-filler fitting into the trough of the rim and being formed of straight unconnected strips of wood bent dry to the circumferential curve of the rim, said metal rim having spoke holes formed therein with outwardly extending burrs or projections thereabouts which are forced into the wood-filler and prevent its creeping and means for holding all parts of said unconnected wood-filler to the metal rim.

10. As a new product, a wood-filled metal rim adapted to have a rubber tire cemented thereto and comprising a metal rim trough-shaped in cross section with its edges turned down to engage and hold a wood-filler in place, a wood-filler fitting into the trough of the rim and being formed of straight unconnected strips of wood with transverse slits cut therein from the inner side towards the outer side and bent dry to the circumferential curve of the rim, said metal rim having spoke holes formed therein with outwardly extending burrs or projections thereabouts which project into the wood-filler and prevent its creeping.

11. The process of forming a wood-filled metal rim adapted to have a rubber tire cemented thereto which consists of forming an outwardly opening trough-shaped metal rim with spaced outwardly extending burrs or projections in the trough thereof, placing in the trough a wood-filling consisting of straight, unconnected pieces of wood, bending the filler dry to the circumferential curve of the rim, forcing said projections of the rim into said filling and at the same time rolling the outwardly extending edges of the metal rim towards each other and down closely upon the outer edges of the filling.

12. The process of forming a wood-filled metal rim adapted to have a rubber tire cemented thereto which consists of forming an outwardly opening trough-shaped metal rim with spaced spoke holes formed therein with outwardly extending burrs or projections about said holes, placing in the trough a wood-filling consisting of straight unconnected pieces of wood, bending the filler dry to the circumferential curve of the rim, forcing said burrs of the rim into said filling and at the same time rolling the outwardly extending edges of the metal rim towards each other and down closely upon the outer edges of the filling.

In witness whereof I have affixed my signature, this 6th day of January 1922.

CHARLES F. MENGE.